United States Patent [19]

Ching et al.

[11] Patent Number: 4,665,514
[45] Date of Patent: May 12, 1987

[54] INTEGRATED VOICE/DATA NETWORK

[75] Inventors: Yau-Chau Ching, Morganville; Nian-Chyi Huang, Bridgewater; James D. Tomcik, Aberdeen, all of N.J.

[73] Assignee: American Telephone and Telegraph Company, AT&T Bell Laboratories, Murray Hill, N.J.

[21] Appl. No.: 762,131

[22] Filed: Aug. 2, 1985

[51] Int. Cl.[4] .............................. H04J 3/24; H04J 3/00
[52] U.S. Cl. ........................................ 370/60; 370/94; 370/109
[58] Field of Search ................... 370/60, 94, 85, 111, 370/109; 179/2 EB

[56] References Cited

U.S. PATENT DOCUMENTS 4,519,073  5/1985  Bertocci et al. ..................... 370/109
4,538,263  8/1985  Gabrielli et al. ..................... 370/94
4,550,397 10/1985  Turner et al. ........................ 370/94
4,561,090 12/1985  Turner et al. ........................ 370/94

Primary Examiner—Douglas W. Olms
Assistant Examiner—Curtis Kuntz
Attorney, Agent, or Firm—Jerry W. Herndon

[57] ABSTRACT

Circuits at a remote transmission site receive digitized voice and data samples from incoming channels. The voice samples are compressed. The samples are formatted into fixed-size data blocks with signaling and control information for transmission to a switching node. Additional bits of the voice samples are dynamically dropped, if necessary, to fit the data into the fixed-sized blocks. The signaling and control information allows receiving circuits at the switching node to determine the number of bits allocated to each sample. These receiving circuits form packets for individual channels by attaching switch routing packet headers to the individual channel data. Packet receiving circuits on the output side of the switch reformat the received packets into fixed-size nonpacket data blocks for transmission.

25 Claims, 13 Drawing Figures

PACKET FORMAT

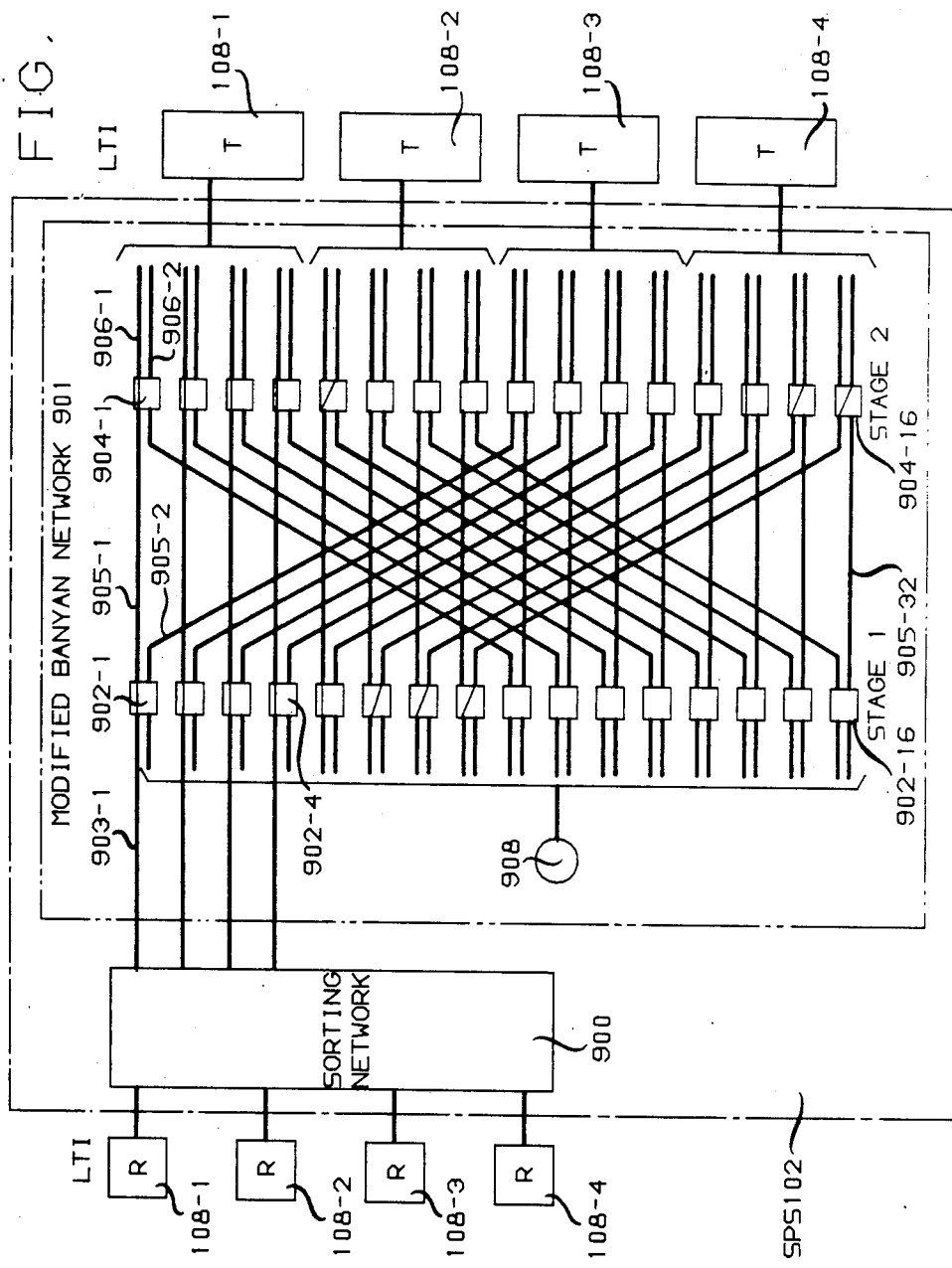

INTEGRATED VOICE/DATA NETWORK

TECHNICAL FIELD

The invention relates to data and telephone networks in general and, in particular, to an integrated data and digitized voice network having certain characteristics of a packet switching network and other characteristics of a circuit switched network. Similar to a packet switching network, this network increases the efficiency of the transmission system when it carries bursty traffic such as data and digitized voice. Packet overhead inefficiencies in transmission are eliminated, while packet switching delays are reduced and made substantially uniform.

BACKGROUND OF THE INVENTION

In the past decade, there has been increasing interest in studying the potential of integrating voice and data traffic in both long haul and local area networks. Integration offers the capability of dynamically sharing transmission and switching facilities among different services and has the flexiblity to accommodate new services. Several alternative integrated network structures have been recently investigated. In general, they are variations of three broad switching technologies: circuit switching, packet switching, and hybrid switching.

In traditional circuit switching, a complete end-to-end circuit is established for each pair of voice and data users and dedicated for the full duration of a call. The circuit is disconnected when either party hangs up. The primary characteristics of a circuit switched network are fixed-bandwidth and low transmission delay once a connection has established. Such a circuit is inefficient in carrying bursty traffic of the type common in terminal-to-computer or computer-to-terminal communications. Moreover, on voice connections, the average actual time that speech is present on channels is less than 40 percent. This low activity is largely due to the fact that a talker speaks less than half the time during a conversation. In addition, pauses usually occur between the utterances of a speaker.

Time assignment speech interpolation (TASI) and digital speech interpolation (DSI) systems have been used in some instances to take advantage of the burstiness of voice traffic. TASI systems operate by assigning a transmission circuit to a conversation only when speech is present. During idle intervals and pauses, the transmission circuit is assigned to another conversation. DSI systems utilize, in addition to speech interpolation techniques, sophisticated speech encoding techniques to minimize the bandwidth required for the transmission of speech. The April 1982 issue to the *IEEE Transactions on Communications* is devoted to a discussion of these types of techniques.

Packet switching also takes advantage of the burstiness of digitized speech and data communications. User information streams are divided into segments that are combined with headers to form packets. A packet switching network routes the packets to their appropriate destinations based on addresses contained in the packet headers. In this way, the network resources are statistically shared among all users, rather than being dedicated to users on a full-time basis. An inherent characteristic of packet switched networks is large and variable end-to-end delays that may be experienced by individual packets during transport. In the case of digitized voice, large variable packet delays seriously affect the intelligibility of speech and may become intolerable. Corrective measures called time stamps are often employed to smooth the delay, but cause additional overhead. Another problem is that packets can be delivered out of order to a destination if corrective measures are not taken. Complicated transmission protocols are typically used to avoid this problem.

In hybrid switching schemes, some combination of circuit switching and packet switching is used, typically circuit switching for voice and bulk data, and packet switching is used for data. The transmission facilities are shared between both circuit switched traffic and packet switched traffic.

In addition to the three basic switching techniques, other advanced switching techniques have been studied in the literature. One such technique is called fast circuit switching. The concept is to setup and takedown a circuit through a switching node at the beginning and end of a talkspurt or data packet. A talkspurt is an interval of essentially continuous speech between pauses. Talkspurts in the range of about one second are typical. The performance of such a network is qualitatively discussed in an article by E. A. Harrington, entitled "Voice/Data Integration Using Circuit Switched Networks" and appearing in *IEEE Transactions on Communications,* June 1980, Vol. COM-28, No. 6. To the best of our knowledge, no implementation of a fast circuit-switched network exists at this time.

A further type of switching for integrated voice and data is briefly discussed in an article entitled "Burst Switching - An Introduction," by S. R. Amstutz and appearing at page 36 of the *IEEE Communications Magazine,* November 1983. The article describes a host of small switching nodes interconnected by T1 carrier links. According to the article, a fundamental difference between this system and other packet switching systems is that its T1 transmission circuit rate equals the bit-rate of a digitized voice circuit, thus eliminating the need to packetize the voice samples, and the resulting packetizing delays at the nodes. Our network is different from the burst switching network in many aspects. There are two major differences that are directly related to the aspects of the invention. We use self-routing packet switches to ease the switching of talkspurts and data packets. In addition, we use dynamic bit assignment controllers to resolve momentary overloads of transmission systems.

SUMMARY OF THE INVENTION

An advance in the telephony art is achieved in an integrated data and voice switching network. In a preferred and illustrative embodiment of the network, a remote transmission site receives digital data and digitized voice samples from incoming digital channels. Circuits at the remote site detect active and idle intervals of activity on the channels having established calls. The digital data and digitized voice samples from active channels, as well as signaling and control information, are collected and reformatted into fixed-size data blocks for transmission in a nonpacket format to a packet switching node. The signaling and control information includes, for example, logical channels numbers assigned to each cell. Because the number of active channels varies at any given time, compression of the samples is used as appropriate to fit the digital data and digitized voice samples into the fixed-size data blocks.

A data block receiving circuit at a switching node separates the samples associated with each logical channel number and generates a packets by attaching packet headers with a switch routing addresses to the separated samples. The generated packets are then sent to a packet switch for distribution. The circuits at the output side of the switch receive the packets, strip away the packet headers, and reformat the digital data and voice samples for different calls to fixed-size data block nonpacket format for transmission to another switching node or remote site.

Compression of the digitized voice samples is achieved by calculating the amount of space remaining in a fixed-size data block after accounting for the space required for the signaling and control information found on one channel scanning pass. The remaining space is divided by the number of entries made into the data block. One or more of the least significant bits of each digitized voice sample may be eliminated so that all entires will fit into the block. If this results in any unused space in the block, an appropriate number of samples are reallocated an extra bit to utilize the space.

The signaling and control information further includes an active/idle indication and fixed/variable indication. An active indication means that the associated channel is actively engaged in a talkspurt. An idle indication means that the associated channel has just finished a talkspurt and is presently idle. A fixed indication means that the associated channel contains data bits that cannot be dropped. A variable indication means that the associated channels contain digitized voice samples so that we may drop the least significant bit(s) if necessary. In general, the signaling and control information is sent only when the associated channel changes it active/idle or fixed/variable status. This information is used by the receiving circuits at the switching node to update its channel status record so that it can perform the same calculations as at the remote site to determine the bits allocated to each channel.

The network is also capable of simultaneously processing both digitized voice samples and digital data. The digital data, of course, cannot be compressed by bit-dropping without destroying the data. Therefore, the remote transmission sites classify calls as either digital voice, which can be compressed, or as voice-band data or digital data, which cannot be compressed. This classification is taken into account when bit-dropping is performed on the digitized voice. In addition, an indication is sent in the signaling and control information for each digital data and voice-band data entry that bit-dropping cannot be performed on the data. This indication is also used by the receiving circuits at the switching node to calculate the number of bits allocated to each entry.

The packet switch at the switching node self-routes packets through its internal stages based on the routing address in the packet headers.

In accordance with another aspect of the invention, the switch is arranged to be statistically contention-free at its internal stages. Therefore, no internal buffering is required. This is accomplished by first sorting the packets on the routing address with, for example, a batcher sorting network. The stored packets are then inputted to a modified banyan network. One modification is that the number of paths through the network is expanded by a factor of K, where K is a power of 2. In addition, the final $\log_2(K)$ stages of a conventional banyan network are removed. This allows K packets to be directed simultaneously to a single receiving circuit on the output side of the switch without a collision inside the switch.

BRIEF DESCRIPTION OF THE DRAWING

In the drawing.

FIG. 11 shows structural details of our modified batcher/banyan switch.

DETAILED DESCRIPTION

Figure 1:
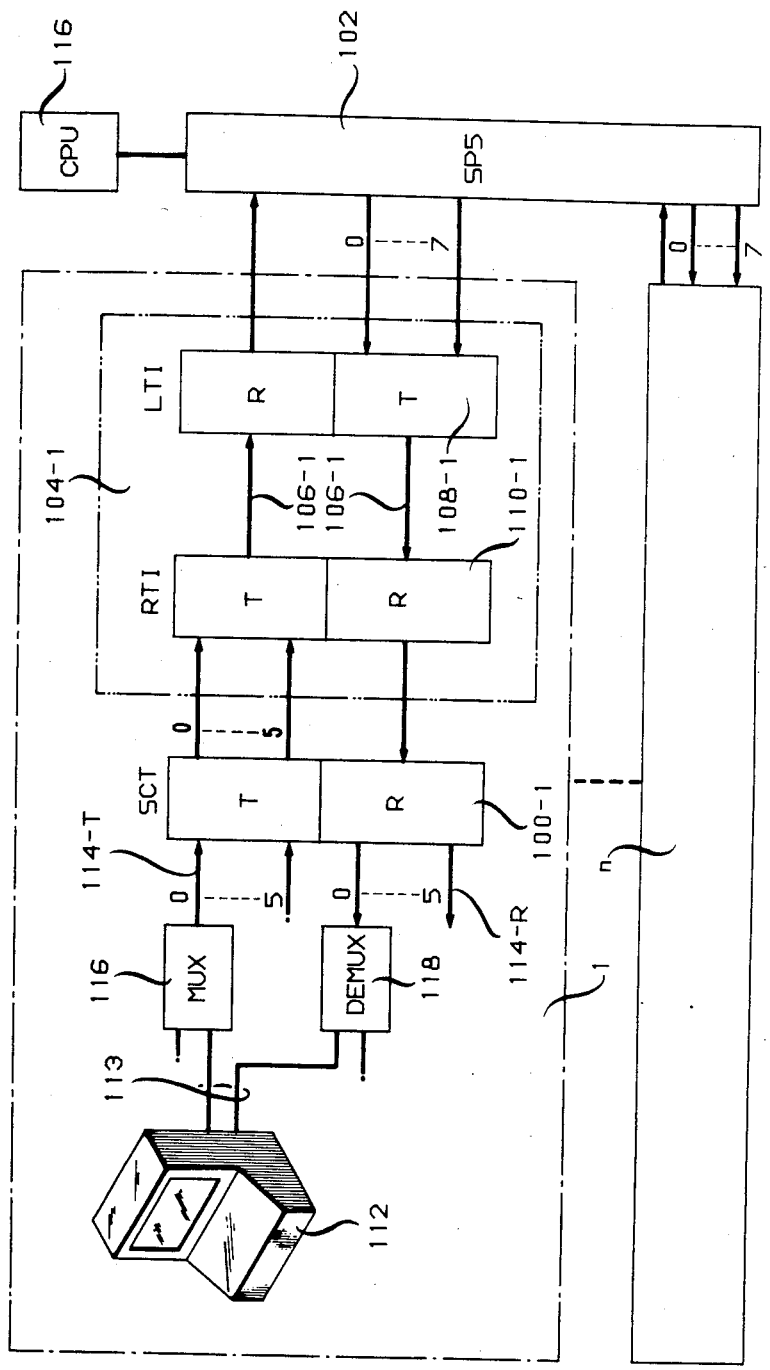
FIG. 1 shows an illustrative block diagram of the overall network.

The network architecture is shown in FIG. 1. The network consists of three major types of components: at least two statistical compression terminals (SCT) 100-1 and 100-N, one at each end of the network, at least one self-routing packet switch, referred to herein as a synchronous packet switch (SPS) 102, and a synchronous transmission system (STS) 104-1 connecting SCT 100-1 to SPS 102. Only one SPS 102 is shown in FIG. 1. As will become apparent, however, any number of switching nodes may be included. Other transmission systems such as 104-N may also interconnect other SCTs, such as 100-N, to SPS 102 and to other SPSs if more than one is present. The stations and terminals 112 are connected in transmitting and receiving directions, respectively, to multiplexing circuits 116 and demultiplexing circuits 118. Each of circuits 116 and 118 are in turn connected to an SCT 100-1 by transmission links 114-T and 114-R, respectively.

The network functions boardly as follows. Digitized voice samples or digital data generated at stations and terminals 112 are received on a transmission link 114-T in non-packet format at a transmit (T) section of an SCT 100-1. The SCT 100-1 recognizes when the incoming voice channels are engaged in active talkspurts and when data channels are engaged in transmitting packets. Digitized voice samples are compressed using adaptive pulse-code-modulation (ADPCM) techniques. The compressed voice and digital data are then handed off by the SCT-T circuit to an RTI-T circuit.

RTI-T 110-1 dynamically reformats and the compressed voice and data from SCT-T 100-1 to fit within the transmission link 106-1 processing cycles and transmits the compressed voice and data in non-packet format over a transmission link 106-1 to a receiving section (R) of a local trunk interface circuit 108-1 located at the SPS 102.

If the resulting compressed voice and data from SCT-T 100-1 does not fit into a fixed size processing cycle on a transmission link 106-1, the voice samples are further compressed by dropping one or two least significant bits from the ADPCM coded voice samples then present from as many voice trunks as required. The digital data channels are not subject to bit dropping. The bit assignment process is based on the channel status. The algorithm will become apparent later. Each processing cycle on transmission link 106-1 is divided into a signaling field and an information field containing the compressed voice and data. The control information in the signaling field specifies channel numbers on which talkspurts or data packets are beginning and ending. A channel engaged in a talkspurt or a dataspurt will henceforth be called an active channel. Each voice and data channel has a logical channel number in the transmission link 106-1. Each entry in the signaling field also identifies a logical channel number (LCN) associated with the call in question for the communication link between RTI-T 110-1 and LTI-R 108-1. The control information specifies changes of channel activity. Both RTI-T 110-1 and LTI-R 108-1 maintain a table of current channel activity. Therefore, the control information on the changes of channel activity is used to keep these two tables in step with each other.

LTI-R 108-1 receives the information bits from RTI-T 110-1 and converts each block of bits for each of the active logical channels into individual packets. To do so, it has to identify the number of bits allocated to each active logical channel. With the table of channel activity, it uses the same bit assignment process to reassign the information bits to active logical channels and it uses the routing addresses stored n LTI-R 108-1 for each logical channel to generate packet headers. The packet headers are prepended to the information blocks for each active channel. The generated packets are then passed to SPS 102 which routes them to outgoing ports of the switch according to the routing addresses contained in the packet headers.

At the outgoing port, a T section of each local trunk interface circuit, such as LTI-T 108-1 and 108-N, receive the packets, strips away the headers, dynamically reformats the received data to fit within processing cycles on a transmission link, and transmits the reformatted data in non-packet format to destination SCTs, such as SCT 100-N, and ultimately to receiving stations and terminals 112.

In more detail now, each data transmission system 104 comprises a time-division-multiplexed T1 carrier system 106-1, available from AT&T Technologies and other sources. Obviously, other types of transmission media would also be satisfactory. The transmission media 106-1 is terminated at each end by the trunk interface circuits 108-1 and 110-1. A trunk interface circuit on the SPS side of the transmission link 106-1 is identified as LTI (local trunk interface) 108-1, while that at the SCT side is identified as RTI (remote trunk interface) 110-1 for convenience. LTI 108-1 and RTI 110-1 are identical circuits in the disclosed embodiment. However, they need not be. The SCTs, RTIs, and LTIs each have transmit (T) and receive (R) sections. The transmit section of each SCT 100-1 receives information from a plurality of end user terminals and stations, such as 112. In this illustrative embodiment, each SCT-T has six inputs 0 to 5, each of which is connected to the output of a multiplexer 116 via a transmission link 114-T. Each multiplexer 116, in turn, services a plural number of the terminals 112. Similarly, the receive sections SCT-R of SCTs 100-1 are connected to end user terminals via demultiplexers 118 and transmission links 114-R. In practice, a single transmitting link 114-T and a single receiving link 114-R may be realized by a single T1 carrier system.

A T1 carrier system contains 24 time-division multiplexed channels, each of which may contain pulse-code-modulated 8-bit samples representing a single voice or 64 kilobit per second channel. Since each SCT has up to 6 such T1 inputs, it must be able to process up to 24*6=144 such channels and to compress the resulting output information to an amount compatible with the single T1 carrier system 106-1. SCT-T 100-1 accomplishes this by a combination of speech interpolation, similar to that used in TASI multiplexers, and embedded ADPCM coding. The speech interpolation techniques assure that only active voice channels are encoded for transmission. The embedded ADPCM coding involves a recording of 8-bit PCM voice samples in each of the T1 transmission link 114 into 4-bit samples. In addition, variable bit rate reduction is performed on digitized voice samples, as will be seen. The variable bit rate reduction involves the dynamic dropping of the least significant bits of the 4-bit encoded voice samples when the number of active channels are sufficient to otherwise overload the capacity of transmission link 106-1.

SCT-T 100-1 classifies each active incoming channel into either a voice channel or a data channel. Data channels cannot tolerate bit rate reduction. Therefore, for these channels, full 4-bit samples are maintained, corresponding to a rate of 32 kilobits per second. In overload situations in which the capacity of a transmission link 106-1 will be exceeded, however, one or two of the least significant bits of the 4-bit voice samples, as required will be discarded in RTI-T 10-1 until the number of active channels diminishes to an apropriate amount.

Information describing when channels become active or idle (not talkspurt or dataspurt), together with the droppable or non-droppable indicator of the channels are transmitted from SCT 100-T to RTI 110-T. Logical channel numbers (LCNs) are assigned by SCT-T 100-1 and transmitted to RTI-T 110-1 as well. RTI-T 110-1 formats the blocks of transmission for compatibility with transmission link 106-1 and transmits the information to LTI-R 108-1 at the location of SPS 102. In addition, SCT-T 100-1 determines which of the incoming channels on transmission link 114-T are active, i.e. engaged in a talkspurt and which are not, and communicates this information to RTI-T 110 as well.

Figure 2:
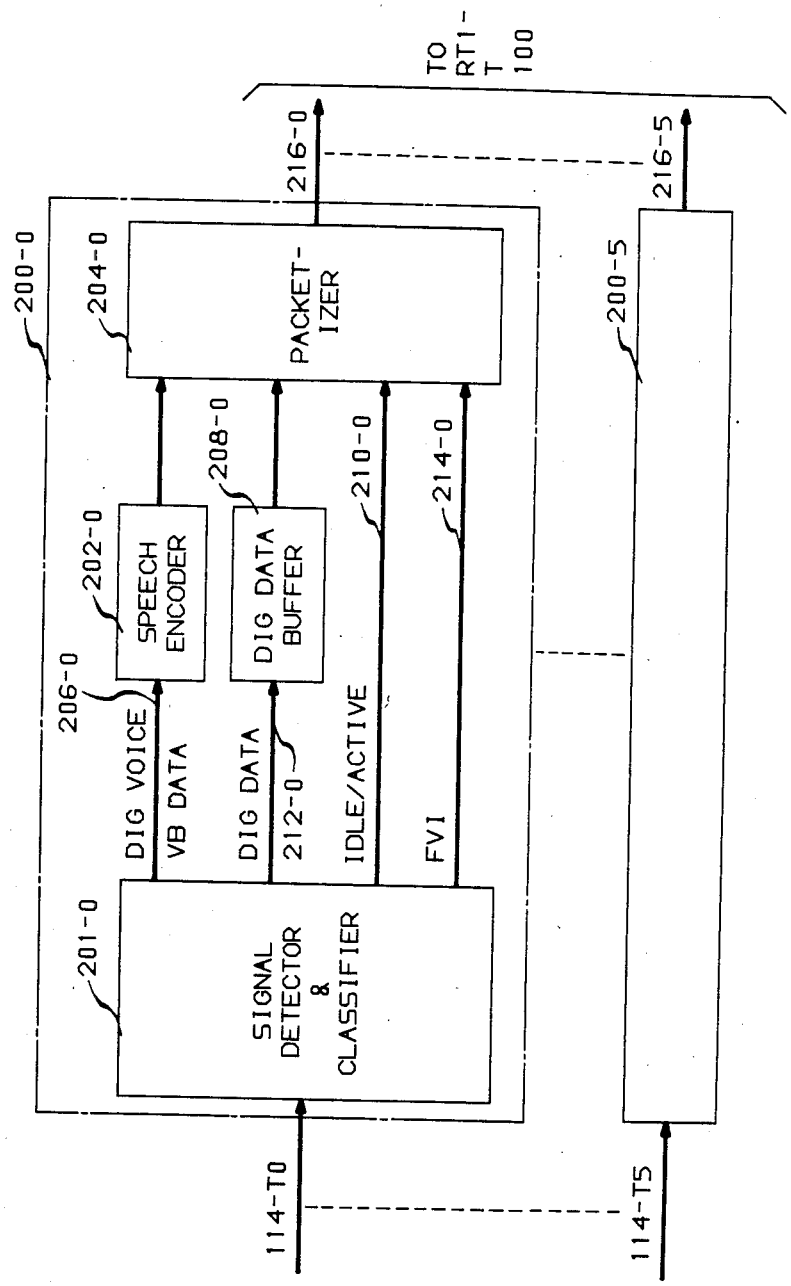
FIG. 2 shows an illustrative block diagram of statistical compression terminal located at a remote site. This terminal detects active and idle intervals on established calls on incoming channels. It classifies samples on active channels as digital data, digitized voice or voice-band data, compresses voice or voice-band data samples using known compression algorithms, and then packetizes the compressed data for handoff to a trunk interface circuit also locate at the remote site.

FIG. 2 shows structural details of SCT-T 100-1, which comprises six circuits 200-0 to 200-5, one for each of the six T1 carrier inputs 114-T 0 through 5. Only 200-0 will be described since all of the six circuits are identical. 200-0 includes a signal detector and classifier 201-0, a speech decoder 202-0, digital data buffer 208-0, and a packetizer 204-0. The signal classifier 201-0 sequentially and respectively scans the channels (time slots) of the T1 transmission link 114-T0 and distinguishes the input trunks between idle and active trunks. The design of a signal detector and classifier is described in U.S. Pat. No. 4,281,218, issued July 28, 1981 by C. S. Chuang, entitled "Speech-Non-Speech Detector".

A stream of idle/active signals are sent to packetizer 204-0 on lead 210-0 as each channel is classified. If active, a channel is further classified as a digital data, digitized voice or voice-band data. Digitized voice and voice band data are transmitted to speech encoder 202-0 on lead 206-0. Digital data are transmitted to a buffer 208-0 on lead 212-0. The purpose of the buffer 208-0 is to accumulate 32 bits for handoff to packetizer 204-0. In addition, for digital data or voice-band data, signal classifier 201-0 sends a "1" signal to packetizer 204-0 on FVI lead 214-0 to indicate that these channel are not allowed to be further compressed to less than a 32 Kbps rate. Conversely, for digitized voice channels, a "0" is sent on lead 214-0 indicating that further bit-dropping is permissible if necessary.

Speech encoder 202-0 encodes the 8-bit T1 speech or voice-band data samples into 4-bit samples (equivalent to a 32 Kbps rate) using an embedded ADPCM encoding technique. The performance of embedded ADPCM encoding technique is quantitatively discussed in an article by D. J. Goodman, entitled "Embedded ADPCM for Variable Bit-Rate Transmission," *IEEE Transactions on Communications*, July 1980, Vol. C-28, No. 7.

Figure 3:
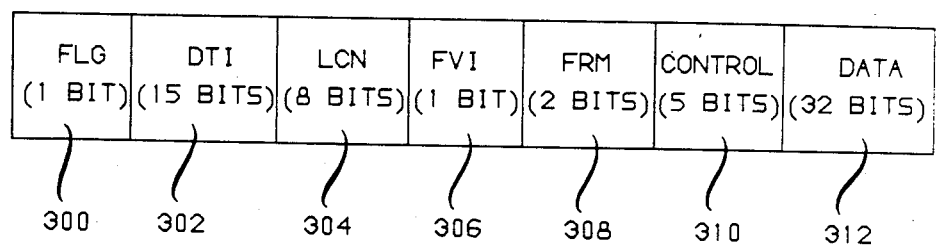
FIG. 3 shows an illustrative format of a packet.

Packetizer 204-0 repetitively cycles through a procedure in synchronism with signal classifier 201-0 in which it first examines the state of the ACTIVE/IDLE lead 210-0. If the input channel being processed at this time is shown as being idle, packetizer 204-0 steps to the next channel without any further action. If the input channel is active as indicated by lead 210-0, packetizer 204-0 accepts eight 4-bit samples from speech encoder 202-0 or 32 bits from digital data buffer 208-0, whichever is active. Packetizer 204-0 now builds a packet for transmission to its associated RTI-T 110-1. The format of the packet is shown in FIG. 3. A packet illustratively contains 64 bits consisting of a packet header of 32 bits and 32 bits of data. Packetizer 204-0 builds a packet header consisting of fields 300 through 310. Field 306 (FVI) is set to the state of the FVI lead 214-0. Field 300 (FLG) is set to the active/idle stat of the channel as indicated on the lead 210-0. Field 308 (FRM) is set to the content of a 2-bit frame counter that is located in 216-0. The purpose of the frame counter is described below. In addition, packetizer 204-0 assigns an LCN to each channel presently being processed and places the LCN in field 304. Arbitrarily, the LCN is set to correspond one-to-one with the relative input channel number. Thus, time slot 0 of T1 carrier 114-T0 0 is LCN 0, time slot 0 of 114-1 is LCN 25, etc. The header also includes a destination trunk identification (DTI) field 302 and space field 310. The DTI and FLG fields are for use at the switching nodes, such as SPS 102, and are discussed at the appropriate points below. Thirty-two bits of data from an incoming channel is appended to the header in field 312. The resulting packet is then transmitted to a remote trunk interface such as RTI-TO.

In accordance with one aspect of the invention, a remote channel interface takes the packet from an SCT and dynamically reformats it, and assigns block sizes to each active channel to fit signaling field and information field (FIG. 4) into fixed size processing cycles in non-packet format on a transmission link 106-1 to SPS 102. To accomplish this purpose, the RTI-T maintains a channel activity table (CAT) which describes logical channels which are active and indicate whether the data associated with the active channels can be compressed to less than 32 Kbps. Based on the contents of the CAT, an allocation processor assigns processing cycle space on transmission link 106-1 to the active channels. When an entry in CAT changes, a signaling word is transmitted to a receive (R) section of a local trunk interface as part of the signaling field in the transmission link 106-1 processing cycles so that the R section can remain in step with the T section of the RTI.

Figure 5:
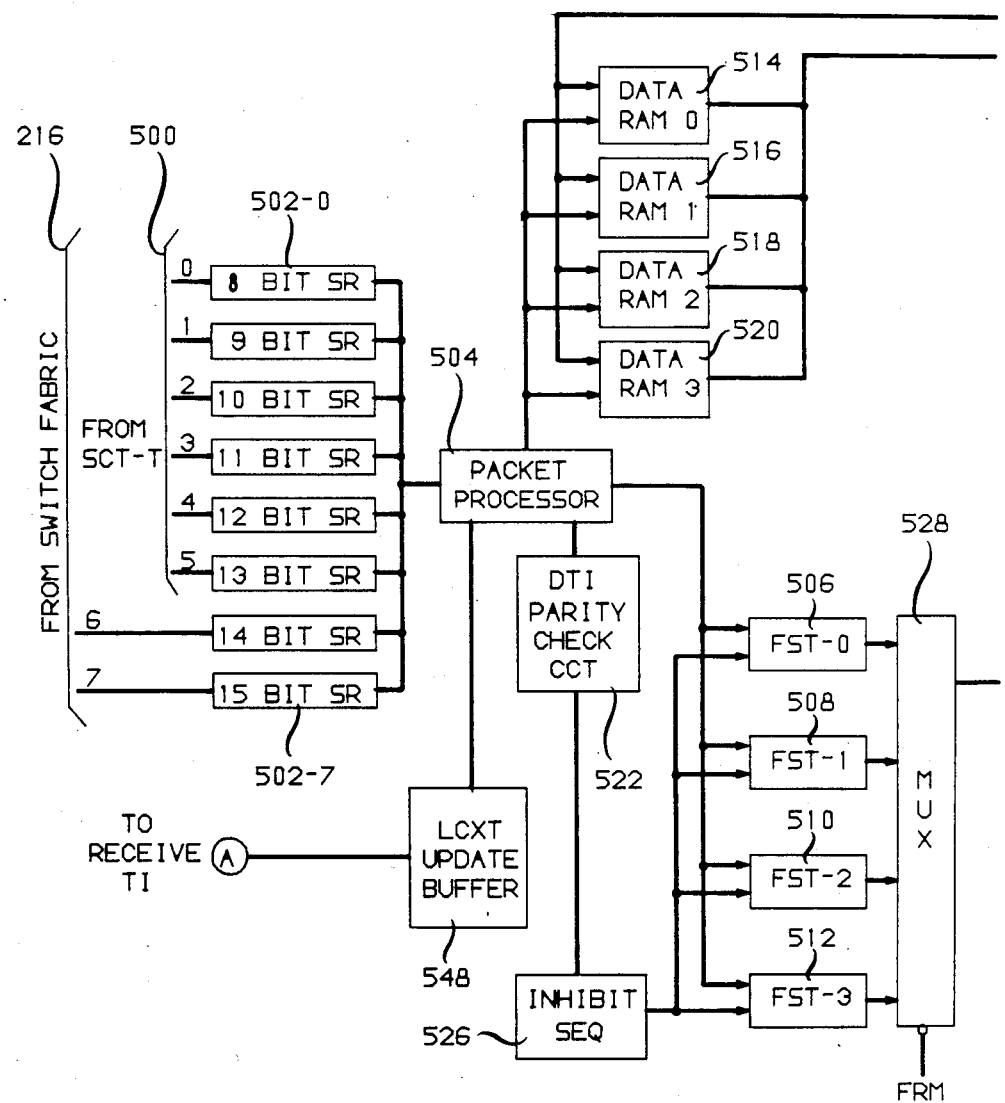
FIGS. 5 and 6 when arranged in accordance with FIG. 12 show illustrative structural details of a transmitting section of a trunk interface circuit used at a remote site for transmitting data blocks to a switch node or vice versa.
Figure 6:
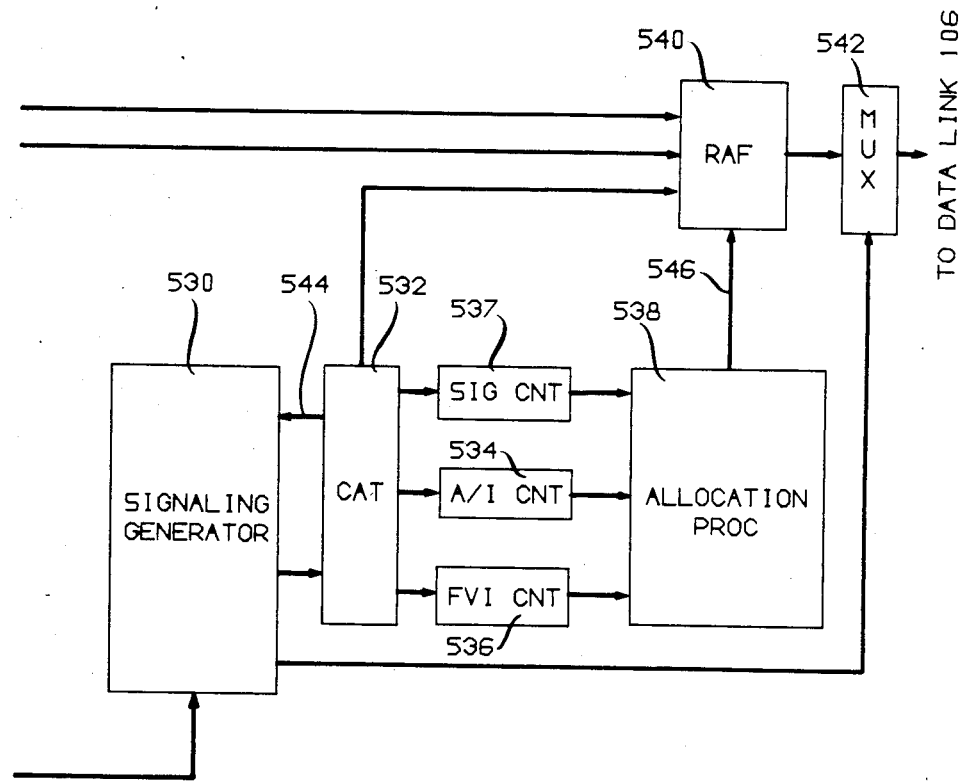
Figure 12:
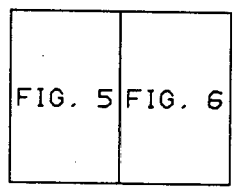
FIGS. 12 and 13 show the connections of FIGS. 5 and 6, and FIGS. 9 and 10 respectively.
Figure 13:
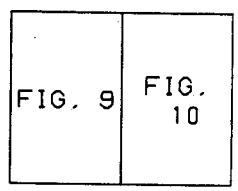

The details of a transmit section of a trunk interface such as RTI-TO are shown in FIGS. 5 and 6. Respective ones of the SCT-T outputs 216-0 through 216-5 are connected to a corresponding one of the inputs 0-5 at 500 of FIGS. 5 and 6. Each of these inputs are in turn connected to inputs of shift register (SRs) 502-0 to 502-5. SR 502-0 is illustratively 8 bits in length. SRs 502-1 to 502-7 are each successively longer than the preceding SR by 1 bit. The reason for this will become apparent. Packet information from each of the six SCT-T outputs in FIG. 2 are continuously clocked out serially to the corresponding inputs 500 in FIGS. 5 and 6. Beginning with the ninth clock cycle from some relative beginning time, an 8-bit word which has been accumulated in SR 502-0 is outputted in parallel to a packet processor 504. The ninth clock cycle also shifts the contents of each of the SRs 502-1 to 502-5 one bit, so that now an 8-bit word present in 502-1 is ready to be outputted. On the tenth relative clock cycle, this word is outputted from SR 502-1 to packet processor 502. This process continues until a word is outputted from SR 502-5 on the fourteenth relative clock cycle to a packet processor 504. Words from SRs 502-6 and 502-7 are outputted on the fifteenth and sixteenth relative clock cycles, but since these SRs contain no information, their "0" contents are ignored by the remaining circuitry of the RTI-T, as will be seen. While outputs are being taken from the above SRs on clock cycles nine through fourteen, the SRs are refilling with new data from SCT-T 100-1. The new data is sequentially transmitted to packet processor 504 on relative clock cycles seventeen through twenty-two, and so on.

The primary purpose of packet processor 504 is to accumulate full 64-bit packets from each of the inputs 500 and to parcel out the correct portions of each packet to the appropriate circuits in the trunk interface circuit. RTI-T has four frame status tables (FST) 506, 508, 510 and 512 and four data random access memories 514, 516, 518 and 520. Four frames of data buffers with proper framing numbers are needed to insure proper order of voice packets. The four frame status tables and data RAMs correspond to the four frames of data indexed by the frame counter mentioned earlier. While packet procesor 504 is outputting information to one FST and data RAM associated with one frame, information in another FST and data RAM associated with another frame is being unloaded and processed. This technique allows for continuous data input from the SCTs and accounts for processing delays in the trunk interface.

Figure 7:
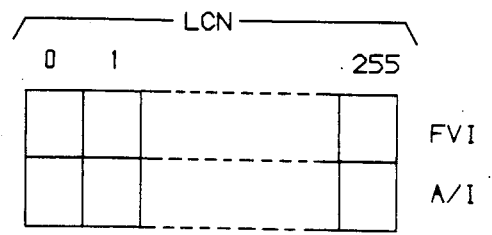
FIG. 7 shows an illustrative format of a channel activity table which is used at remote sites and switching nodes to record the active/idle status of logical channels and to indicate whether or not the associated samples may be subject to bit-dropping.

Assume now that RTI-T 100-1 is processing frame 0 and that packet processor 504 has just accumulated eight words from SR 502-0 that would form a packet from a particular SCT-T active input channel. The accumulated data for an idle channel would be all zeros, for example. Packet processor 504 sends to the FLG bit from field 300 and the FVI bit from field 306 to one of the FST tables determined by contents of the FRM (frame) field 308. The format of each of the FST tables is shown in FIG. 7. Each table contains two bits FVI and A/I (active/idle) for each LCN 0 to 255. The FVI and A/I bits reflect the status of fields 306 and 300, respectively. Thus, if a packet is present, the A/I bit will be set to "1" for the LCN in question and to "0" for no packet.

Before updating one of the FST tables, packet processor 504 first sends the contents of the DTI field 300 to a parity check circuit 522. Recall that the least significant bit of the DTI field is an even parity bit over the remaining contents of the field. The output of parity check circuit 522 controls an inhibit sequencer 526. Should DTI parity fail, inhibit sequencer 526 applies an inhibit signal to each of the FST tables 506, 508, 510 and 512. The purpose is to prevent further processing of a packet that has an incorrect DTI address. However, a DTI address is relevant only at a local trunk interface circuit at an SPS site. The DTI field 300, including the parity bit, at a remote site should always contain all zeros.

Assume that a valid packet is present and that, therefore, inhibit squencer 526 enables the FST circuits 506, 508, 510 and 512. Packet processor 504 updates the appropriate one of the FST tables 506, 508, 510 and 512 determined by the frame number in field 308. This is FST 0 (506) since we are assuming a beginning in frame 0.

Packet processor 504 also uses the FRM field 308 and the LCN field 304 to generate an access in an appropriate one of the data RAMS 514, 516, 518 and 520 and it then stores the packet data contents in field 312 in that data RAM address. The contents of the FRM field determine which data RAM to be addressed, and the LCN determines the internal address in the data RAM.

Figure 4:
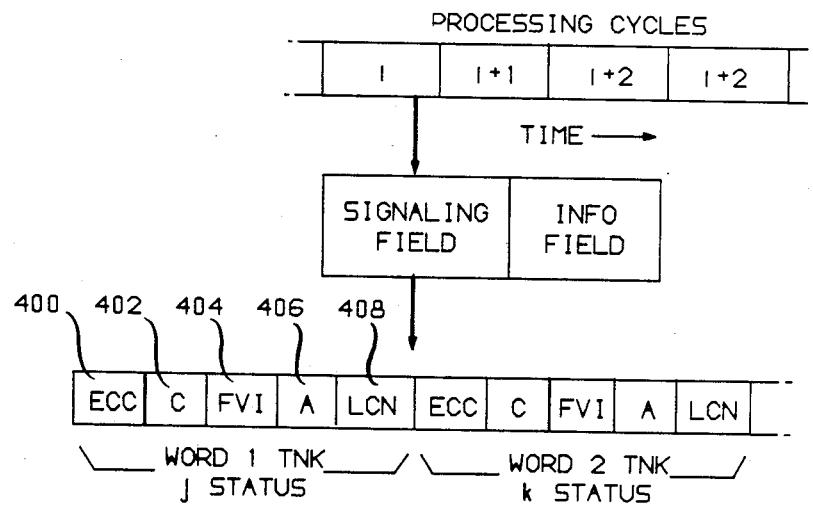
FIG. 4 shows an illustrative format of the fixed-size data blocks which are transmitted to a switching node in recurring processing cycles on a transmission link. As shown, each block is divided into a signaling field and an information field. The signaling field contains signaling and control information for those channels that change their active/idle or fixed/variable status.

The remaining circuits in RTI-T 110-1 format the information contained in the data fields 312 for each active channel so that all of the information fits into the bit capacity of one processing cycle on transmissions link 106-1. FIG. 4 illustrates processing cycles i through i+2 as consecutive blocks on the transmission link. As shown with respect to processing cycle i, each processing cycle consists of a signaling field and an information field. The signaling field contains status entires indicating that a channel goes from an active to an idle condition or vice versa. The information field contains the reformatted information from each of the data fields 312 of active channels. In the signaling field, a variable number of channel status words may be present, one for each change in channel status that occurs in this processing cycle. As shown in FIG. 4, word 1 pertains to a status change of trunk j, whereas word 2 pertains to a status change of trunk k. The format of words 1, 2, etc., is identical. Each of these words contains an error check code ECC (400) which is computed over the corresponding signaling word.

Since the number of words in the signaling field is variable, a continuation flag C (402) is used to mark the last word in a processing cycle so that the beginning of the information field can be determined. The state of the FVI flag (404) in a signaling word indicates whether or not the associated channel may be compressed to less than an equivalent 32 Kbps rate. The state of an activity flag A (406) indicates either that the corresponding channel is presently in an active talk or data spurt (in which case data from field 312 is present in the information field) or that the channel has just become idle (not in an active talk or data spurt—in which case there is no corresponding field 312 data in the information field). Finally, the LCN assigned to the channel in question is placed in an LCN field (408) of each word.

Each processing cycle as illustrated in FIG. 4 is illustratively selected to be 1 millisecond long. Since transmission link 106-1 is assumed to be a T1 carrier which operates at 1.544 megabits/second, each processing cycle consists of 1536 data bits and 8 bits used as T1 framing bits. The remaining circuits of the RTI-T 110-1 to be discussed now must fit all the necessary information for each active channel.

In RTI-T 110-1, a signaling generator 530 sequentially reads the FVI and A/I bits in one of the FST tables for each LCN 0 through 255. The particular FST table being read is determined by a frame signal which enables a multiplexing circuit 528. In particular. the frame being processed by the output circuits of RTI-T 110-1 is always two frames ahead of the frame being processed by the input circuits. Thus, if incoming data is being processed in frame 0, i.e., loading data RAM 514 and FST table 506, signaling generator 530 is reading data from FST table 510 (frame 2). Signaling generator 530 compares each of the FVI and A/I bits from the FST table being read to the corresponding bits in a CAT (channel activity table) 532. The format of the CAT table is identical to that of the FST tables shown in FIG. 6.

The A/I and FVI bits from CAT table 532 are inputted into signaling generator 530 via a bus 544. A signaling word consisting of the present active/idle and the FVI states from the appropriate FST table is sent to an output multiplexer 542 if a mismatch is detected by the signaling generator 530. Multiplexer 542 buffers all signaling words until the beginning of a processing cycle. When a new processing cycle begins, multiplexer 542 combines the signaling words from signaling generator 530 with data from a read address first-in-first-out circuit (RAF) 540 to build the data for the processing cycle. RAF 540 then outputs the result to transmission link 106-1. The output of the signaling generator 530 is also used to update the CAT 532 so that the CAT can maintain the up-to-date channel status.

In accordance with an aspect of the invention, an allocation processor 538 controls RAF 540 to dynamically build the processing cycle data. RTI-T 110-1 contains three counters to enable allocation processor 538 to do this properly. An active/idle (A/I) counter 534 counts the number of active channels, i.e., those in which A/I="1". An FVI counter 536 counts the number of active channels with fixed-size time slots, i.e., those in which FVI="1" (digital data and voice-band data channels). A signaling counters 537 counts the number of signaling words to be contained in the processing cycle. This counter is needed because the number of signaling words in any processing cycle is variable. Each of the counters receives the inputs from the CAT table 532 and outputs their results to allocation processor 538. Counters 534, 536 and 537 are shown as separate circuits in FIGS. 5 and 6 for emphasis and understanding. It is understood, however, that the counter could easily be incorporated into software functions of allocation processor 538 as well.

Figure 8:
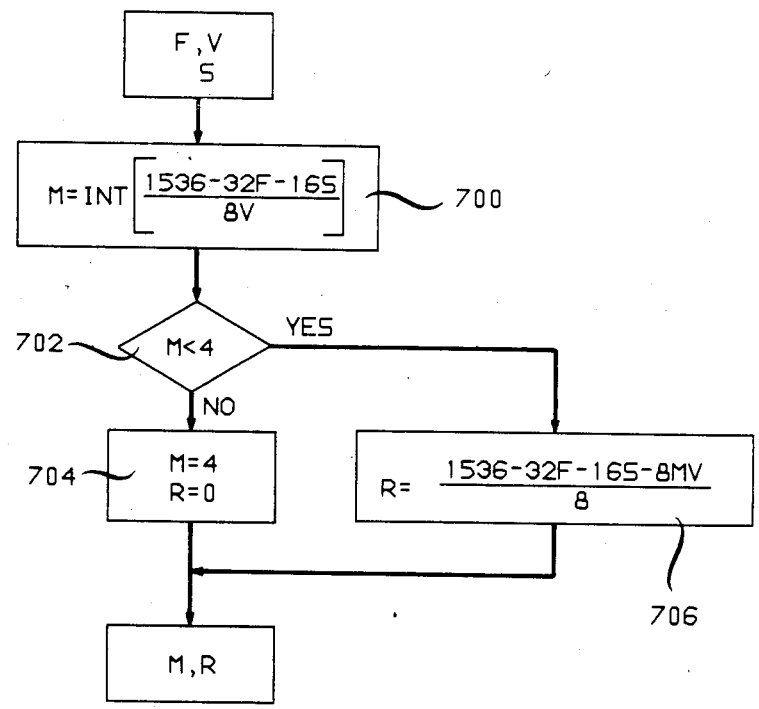
FIG. 8 shows a flowchart of one algorithm for calculating the number of bits allocated to samples that are subject to bit-dropping.

The output of the A/I counter 534 is 7 bits long, which allows up to 128 active channels. The output of the FVI counter 536 is 5 bits long, which allows up to 32 channels with fixed-size time slots. The output of the signaling counter 537 is 4 bits long, which allows up to 16 signaling words. Based on these outputs, the allocation processor 538 calculates the bit size allotted in the processing cycle for each active channel. The algorithm of the calculation is as follows. The flow chart of the calculation is shown in FIG. 8. Let F=Number of channels with fixed-size time slots (output of FVI counter); Let V=Number of channels with variable-size time slots (output of A/I counter−output of FVI counter); Let S=Number of signaling words in a processing cycle (output of signaling counter 537). Then, M bits/sample are allocated to the variable size digitized voice samples by step 700, where $$M = [(1536 - 32F - 16S)/(8V)].$$

The brackets surrounding this equation represent the integer part of the calculation. If M is greater than or equal to 4 at step 702, then M is set equal to 4 bits/sample (or equivalently 32 bits/processing cycle). A variable R indicates the number of variable-size digitized voice channels that may be allocated an extra bit/sample if spare bits exist in the information field as a result of step 700. In the case in which M is equal to 4, all voice channels havae received their maximum number of bits. The variable R is therefore set to the value 0 at step 704. On the other hand, if M<4 (M=2, 3 or equivalently 16 or 24 bits per time slot), then R is set equal to (1536−32F−16S−8MV)/8 at step 706, where R channels will be allocated one extra bit/sample.

The output of allocation circuit 538 on bus 546 is represented by 9 bits. Two bits identify the value of M (M=2, 3, or 4) and 7 bits identify the variable R.

A local trunk interface circuit such as LTI-R 109-1 is shown in FIG. 8. This circuit converts the bit streams (arranged in frame structure) from the incoming transmission link into packets and sends the packets into the synchronous packet switch 102. The number of packets generated in each processing cycle equals to the number of active channels. When the transmission link, such as 106-1, is normally loaded (bit-dropping is not involved), LTI-R generates up to 48 packets/processing cycle. When the transmission link is heavily loaded, LTI-R generates up to 96 packets/processing cycle. LTI-R is divided into four components; receive assignment controller 800, header generator 802, unpacking buffer 804, and control unit 806.

The bit stream incoming from a transmission link is received by a line interface circuit 808. The input bit stream is transmitted to assignment controller 800 on bus 810 and to unpacking buffer 804 on bus 812. Assignment controller 800 receives the signaling fields from a transmission link; an information buffer 814 in unpacking buffer 804 receives the information fields. This is controlled by three switches 816, 818 and 820. At the beginning of a processing cycle, switch 816 is open and switches 818 and 820 are closed. This causes the signaling field to be received by an SEC (single-bit error correction) circuit 822 in controller 800. The SEC circuit is used to avoid occasional occurrence of bit errors due to the noise in transmission line. The SEC circuit uses the ECC code in item 400 of each signaling word to check and correct single-bit error within the signaling word. The signaling word is then sent to update a channel activity table (CAT) 824. This table is identical to the CAT table in LTI-T whose format is shown in FIG. 6. The signaling words are also sent to a continuity check circuit 826 which looks for a marker in the C field 402 to detect the last signaling word in this processing cycle. When the marker is detected, circuit 826 places a signal on lead 828 which causes switch 816 to close and switches 818 and 820 to open. The information field in this processing cycle then flows through a delay circuit 830 to the information buffer 814. At the beginning of the next transmission frame on the incoming transmission link, line interface 808 places a signal on lead 832, which toggles the states of switches 816, 818 and 820 again.

The channel activity table 824 has 256 entries associated with LCNs 0 through 255, each with 2 bits (A/I and FVI), as shown in FIG. 6. These bits associated with the LCNs in items 408 of the signaling words are updated with the information in items 404 and 406 of the signaling words.

There are three counters in receive assignment controller 800: A/I counter 834, FVI counter 836 and signaling counter 838. The A/I counter counts the number of active channels, the FVI counter counts the number of channels with fixed-size time slots, and the signaling counter counts the number of signaling words in the processing cycle in the same manner as described for corresponding counters in the transmit circuit of a trunk interface circuit. The output of the A/I counter is 7 bits (up to 128 active channels), the output of the FVI counter is 5 bits (up to 32 channels with fixed-size time slots), the output of the signaling counter is 4 bits (up to 16 signaling words). Based on the outputs of A/I, FVI and the signaling counters, a processor 840 calculates the size of the time slot in each active channel in the same manner as shown in the flow chart of FIG. 8.

The output of processor 840 is encoded in 9 bits. Two bits are used to code M (M=2, 3, or 4), where M is the number of bits per sample allocated to voice samples, and 7 bits are used to code R, where R is the number of voice channels which are allocated for M+1 bits per sample. The M and R signals inform the control unit 806 as to the size of the time slots for the active channels so that it can unpack the time slots in the information buffer 814 and packetize them.

Header generator 802 contains a logical channel translation Table (LCXT) 844 which has 256 entries corresponding to each LCN, with 24 bits (1-bit FLG, 15-bit DTI, and 8-bit LCN) in each entry. The LCXT is updated by the CPU 116 in the switching node when a call is initiated or terminated, as will be described. After the receive assignment controller 800 has updated its CAT table 824, a counter 842 generates LCNs from 0 to 255 to index LCXT. The CAT table enables a read operation of LXCT 844 for the active channels. The output of LCXT 844 is sent to a header first-in-first-out memory 846, where it is combined with frame numbers and FVI indications to form packet headers.

Delay circuit 830 of the unpacking buffer 804 is implemented by a shift register and stores the input bit stream from the incoming transmission link until the last signaling word is identified by continuity check circuit 826. The information buffer 814 stores the information field of incoming bit stream until the packet headers are generated by header FIFO 846. The size of the information buffer 814 is determined by the maximum processing time required to generate the packet headers.

Control unit 86 receives the packet headers from the header generator 802 and reads the packet data for each of the time slots from the information buffer 814. Each packet header contains an FVI bit identifying whether the packet contains fixed-size or variable-size time slots. For fixed-size packets, the control unit 806 reads 32 bits from information buffer 814. For variable-size packets, the control unit reads a predetermined number of bits (32, 24, or 16 bits determined by processor 840) from information buffer 814. If the packet contains less than 32 bits, control unit 806 adds padding to build all packets to 64 bits (32 bits of data and 32 bits of header). The control unit 806 sends the fixed-size packets to SPS 102 for routing to an outgoing port.

Synchronous Packet Switch (SPS) 102

Figure 9:
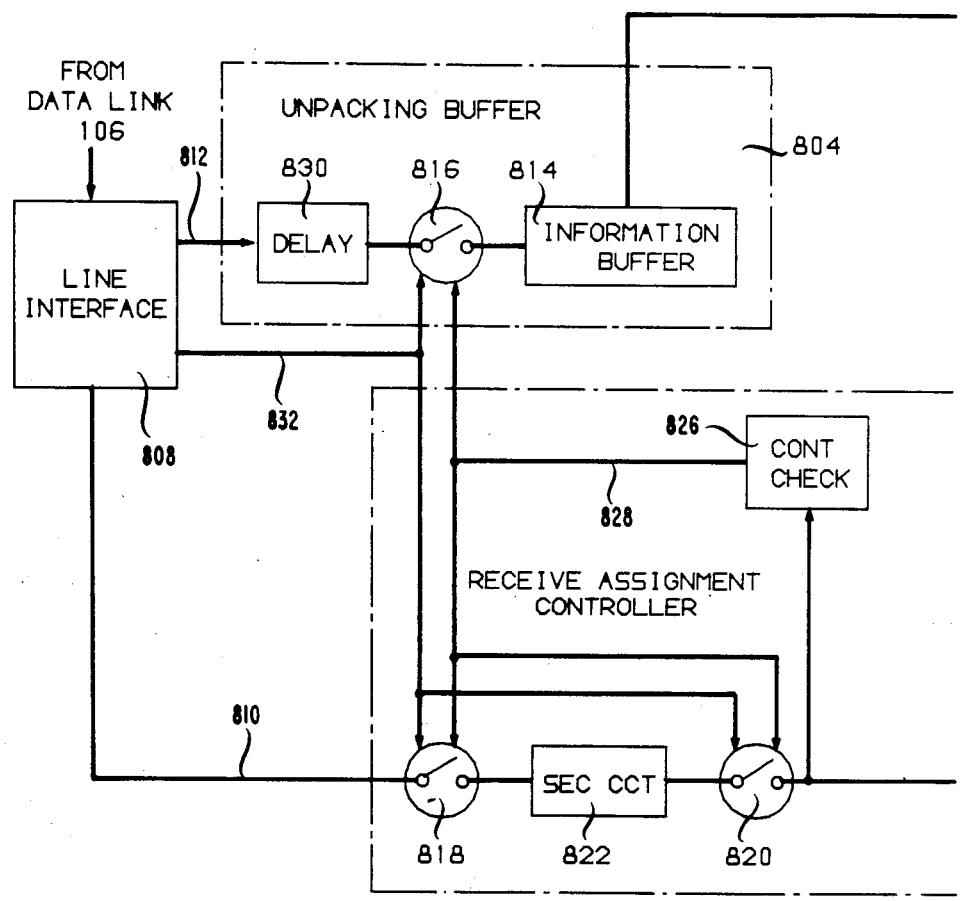
FIGS. 9 and 10 when arranged in accordance with FIG. 13 shows illustrative structural details of a receiving section of a trunk interface circuit used at a switching node for receiving data blocks for a remote site and vice versa.
Figure 10:
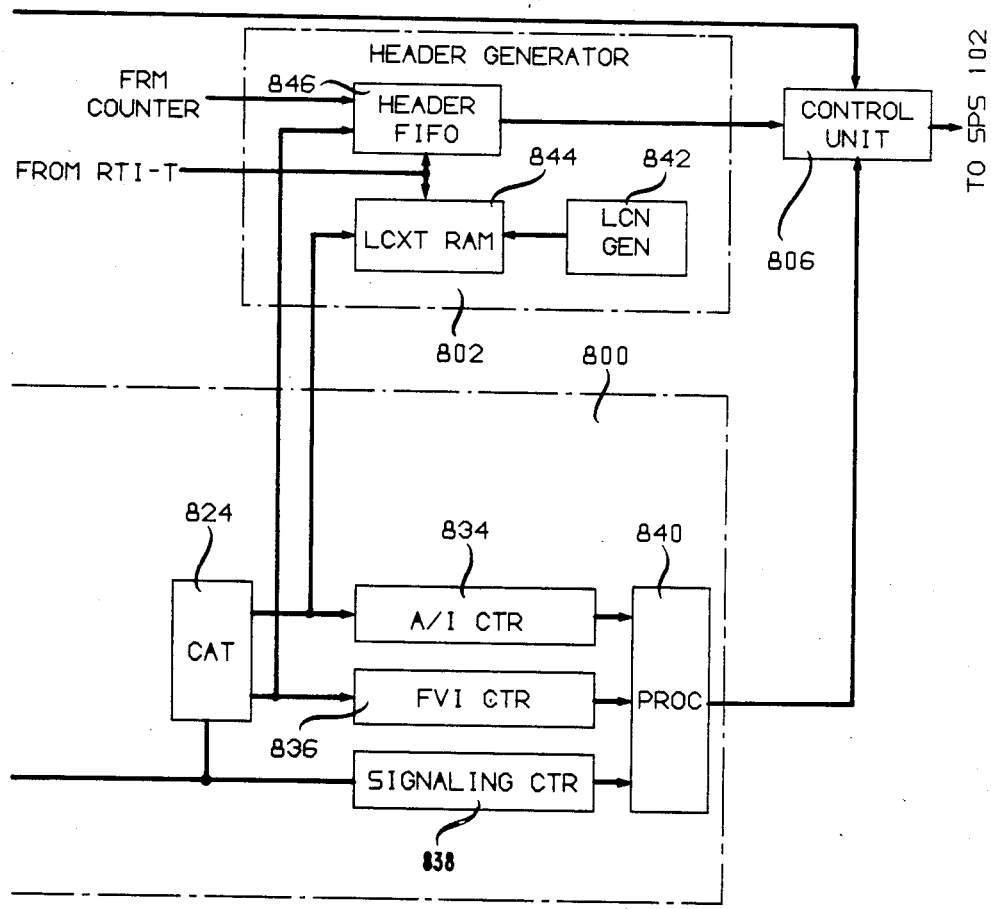

FIGS. 9 and 10 shows one illustrative example of our switch. In this example, the switch connects four R sections of LTI to four T sections of LTI. In accordance with an aspect of our invention, the switch is arranged to be self-routing and contention free at its internal switching nodes and, therefore, bufferless. As shown in FIGS. 9 and 10, packets from the receiving sections of the LTIs are inputted to a sorting network 900. This network may be, for example, a batcher sorting network such as that described in K. E. Batcher's paper "sorting Networks and Their Application," published in the 1968 *Spring Joint Computer Conference Proceedings*, pp. 307–314. Sorting network 900 sorts the incoming packets in accordance with the destination trunk interface (DTI) address in field 302 of the packet header and outputs the sorted packets in numerical order to a modified banyan network 901. Banyan networks are well understood by those skilled in the art and are described, for example, in T. Y. Feng's paper entitled "Survey of Interconnection Networks," *Computer*, December 1981, at pages 12 through 27. The illustrative banyan network of FIG. 11 has two switching stages 1 and 2. Each stage has a plurality of switching nodes, such as 902-1 and 904-1. Each node, such as 902-1, of a banyan network is a simple binary switch between its two input inks and its two output links. The switch is operated according to the state of the first two bits to arrive at the node in a packet header and the link on which the packet is arriving at the node, such as 903-1. Our system is arranged so that a packet is initiated with a FLG bit 300, followed by the DTI field 302. When the FLG bit 300 of the packet header is "0", it means that there is no packet. Therefore, the first bit in DTI field 302 of the packet will not have any effect on the setting of the node. When the FLG bit is "1", it means that there is a packet. The setting of the node is then determined by the first bit of the DTI field. If a packet arrives at node 902-1 on link 903-1, for example, and the first DTI bit is a "0", the packet is routed to output link 905-1. If the first DTI bit is "1", the packet is routed to output link 905-2. In addition, each node rotates the DTI address bits by one bit position as it passes the packet to the next node to put the correct DTI bit in the first bit position for controlling the successive node. This technique of address bit rotation is discussed in detail in U.S. Pat. No. 4,491,945, which was issued to J. S. Turner on June 25, 1982. In the case in which node 902-1 routes a packet to output node 904-1, for example, if the first bit of the rotated DTI field is "1", node 904-1 switches the packet to output link 906-2.

As part of our modifications to a banyan network, we expanded the number of paths that packets directed to the same destination LTI-T may take through the network. We also eliminated a sufficient number of stages of the banyan network so that all paths to a given destination LTI-T terminate on that LTI-T. A full banyan network has $\log_2(L)$ switching stages, where L is a power of 2 and represents the number of output links of the network. If K is the expansion factor of our modified banyan network and is also a power of 2, then the last $\log_2(K)$ stages of our network are eliminated. The illustrative network of FIG. 11 assumes that there are four input ports from, respectively, LTI-R 108-1 through 108-4. This means that up to four packets destined for the same output LTI-T may arrive simultaneously and be routed to the LTI-T without colliding at any of the switching nodes. Packets on the input ports are sorted by sorting network 900 and presented to nodes 902-1 through 902-4 on their respective upper links in the sorted order. The remaining lower links of nodes 902-1 through 902-4 and all links of the remaining nodes of stage 1 are connected to a voltage source 908 representative of a "0" logic stage. The number of stages in the network of FIGS. 9 and 10 is therefore $\log_2(L)$-$\log_2(K)$, or 2 for L=32 and K=8. The first group of 8 output links 906-1 to 906-8 from stage 2 terminate on LTI-T 108-1. Similarly, the next three groups of 8 output links of stage 2 terminate respectively on LTI-Ts 108-2 through 108-4. Those skilled in the art and familiar with banyan networks will have no difficulty, in view of the above, in arranging a switch similar to that in FIG. 11 for any desired number of input and output ports and expansion paths.

Initial Call Setup and Disconnect

Call setup and disconnect is handled by call processors, such as 116 at the switching nodes. Call setup and disconnect packets are generated by the SCTs, such as SCT-T 100-1, when call originations or disconnects are first recognized. Resulting call setup or disconnect messages are transmitted to a switching node using dedicated permanent virtual circuits. For example, in the illustrative network, we use LCN 255 as a dedicated facility to transmit call setup and disconnect messages.

A call setup packet first arrives at a RTI-T circuit from a SCT. Referring to FIGS. 5 and 6, packet processor 504 treats the call origination packet as any other packet. The packet header is used to update the CAT table 532 and is included in the signaling field of a processing cycle for transmission to a LTI-R at a switching node site.

When a call setup message is received by a LTI-R, an appropriate header is attached, as we have already discussed. The header of logical channel 255 has a DTI address of central processor unit 116. In this way, the resulting call setup packet at the LTI-R is routed through the SPS 102 to the central processing unit CPU 116. CPU 116 searches for an appropriate outgoing transmission port and assigns a new logical channel number in the outgoing transmission link to the call. The CPU must inform the associated LTI-R of the address of the outgoing transmission port and the new logical channel number. To do so, CPU 116 then builds and transmits back through SPS 102 a packet including this information and having as a destination the LTI-R that received the call setup message. When the LTI-R receives this packet from CPU 116, it uses the outgoing port address and LCN to update its LCXT table 844. From this point on, succeeding packets for this call are automatically routed to the outgoing port address as already discussed, until a call disconnect message is received from the RTI-T.

Call disconnect messages are handled in the same manner as call origination messages, except that the call linkages and LCNs are released instead of being established.

It is understood that the above teaching of the principles of the invention are illustrative only and that those skilled in the art may recognize many variations that are within the scope and teaching of the invention.

What is claimed is:

1. A data switching network comprising
   at least one packet switching node containing a packet switch,
   at least one remote transmission site and data transmission means between the remote site and switching node, said remote site having
   means for receiving digitized voice and data samples from a plurality of incoming digital channels on each recursive scan of the channels,
   means responsive to the receiving means for detecting active and idle data intervals on the incoming channels,
   means responsive to the detecting means for dynamically compressing the digitized voice samples in an instant scan of samples so that the instant data samples and compressed voice samples fit into a fixed size data block, each data block containing logical channel numbers for the digitized voice and data samples assigned to each incoming channel at the beginning of an active interval, and the samples,
   means for transmitting the data blocks to said switching node, said packet switching node further comprising
   means at an input side (R section of LTI) of the switching node for receiving the data blocks and containing
   means for separating the samples associated with different logical channel numbers,
   means for attaching packet headers containing a switch routing address to the separated samples to form packets,
   means for transmitting the packets to the switch,
   a plurality of means at an output side (T section of LTI) of the switch for receiving packets from the switch, and containing
   means for stripping away the packet headers,
   means for reformatting the digitized voice and data samples into said fixed-size data blocks, and
   means for transmitting the data blocks to another switching node or remote transmission node.

2. The invention of claim 1 wherein the switch comprises
   a digital sorting network for sorting the packets in accordance with the switch routing address, and
   a banyan network having expanded routing paths to provide a prescribed number of separate paths through the banyan network to each receiving means on the output side of the switch.

3. The invention of claim 1 wherein the receiving means at the input side of the switch further comprises
   means for storing switch routing addresses in association with logical channel numbers to enable generation of the packet headers.

4. The invention of claim 1 wherein the fixed-size data block generating means at a remote transmission site further comprises
   means for classifying incoming call samples on established calls as digitized voice samples or digital data,
   means for generating an active signaling word or an idle signaling word when a respective beginning or ending of an active data interval is detected on a call,
   means responsive to the classifying means and to the active/idle signaling words for calculating the space of the fixed-size data blocks required to transmit signaling and control information, and
   means responsive to the calculating means for dropping one or more of the least significant bits of the call samples classified as digitized voice samples so that all samples and signaling and control information fit within the fixed-size data block.

5. The invention of claim 4 wherein the calculating means further comprises
   means for determining a number of the digitized voice samples which may be allocated an extra bit after the initial bit-dropping calculation and still have all the samples and signaling and control information fit within the fixed-size data block.

6. The invention of claim 1 wherein the generating means at the remote transmission site further comprises
   means for including in the signaling and control information for each call entry an active/idle indication, a digitized voice/non-digitized voice indication, a logical channel number assigned to the call, and an indication of the number of call entries present in the data block.

7. The invention of claim 1 wherein the generating means at the remote transmission site further comprises
   means for detecting call originations and terminations, and
   means responsive to the detection of a call origination or a termination for generating a call entry having a prescribed logical channel number reserved for control functions.

8. The invention of claim 7 wherein each switching node further comprises
   a central processing unit connected to a port of the switch corresponding to the prescribed logical channel number reserved for control functions, so that packets generated by an input receiving means having the precribed logical channel number are directed to the central processing unit.

9. The invention of claim 8 wherein the central processing unit is a means for determining an appropriate route through the switch in response to a call origination packet from an input receiving means and for generating a packet containing a destination output receiving means and for returning the generated packet through the switch to the input receiving means.

10. The invention of claim 9 wherein the input receiving means further comprises
    means for storing the identity of the destination output receiving means.

11. The invention of claim 10 wherein the input receiving means further comprises
    means for storing the active/idle indications and the digitized voice/non-digitized voice indications from the remote transmission site in association with the corresponding logical channel numbers.

12. The invention of claim 11 wherein the input receiving means further comprises means responsive to the active/idle and the digitized/non-digitized voice indications for determining the number of bits allocated to samples of each channel in each data block from the remote transmission site, means for collecting samples for each call into packets, means for attaching packet headers containing an address of an appropriate output receiving means, and means for transmitting the packets to the switch.

13. A data switch network comprising one or more packet switching nodes, each having a packet switch self-routing based on address information contained in headers of packets, a plurality of input trunk interface means connected to the switch at a switching node, a plurality of output trunk interface means connected to the switch at a switching node, a central processing unit connected to the switch at a switching node, a plurality of remote transmission nodes, transmission links connecting the remote transmission nodes to ones of the input trunk interface means for the transmission of digital signals pertaining to individual calls in non-packet format, and wherein each of the input trunk interface means further comprises means addressed by relative addresses assigned to the individual calls and contained in the digital signals for storing addresses of ones of the output trunk interface means, means for accumulating a prescribed number of the digital signals for each call into individual data segments, means for appending a header to each segment to create a packet, each header including an address of an output trunk interface means taken from the storing means, means for transmitting the packets to the packet switch, and wherein the output trunk interface means comprises means for reformatting data received in the packets for output transmission in nonpacket format.

14. The invention of claim 13 wherein each remote transmission node further comprises means for packing call samples and signaling information pertaining to calls in progress into blocks of fixed size for transmission on a said transmission link to a packet switching node.

15. The invention of claim 14 wherein the means for packing further comprises means for classifying incoming call samples on established calls as digitized voice samples or digital data, means for detecting dataspurts and talkspurts on the established incoming calls, means for generating an active signaling word during dataspurts or talkspurts of each call or an idle signaling word when an ending of a dataspurt or talkspurt is detected on a call, means responsive to the classifying means and to the active/idle signals for calculating the space of the fixed-size transmission blocks required to transmit the signaling and control information on this pass for established calls, and means responsive to the calculating means for further compressing the present call samples classified as digitized voice samples to fit with the signaling and control information in the fixed-size transmission block.

16. The invention of claim 15 in which the means for further compressing the digitized voice samples comprises means for dropping one or two of the least significant bits of each of the digitized voice samples in accordance with the results from the calculating means.

17. The invention of claim 16 wherein the calculating means further comprises means for determining a number of the digitized voice samples which may be allocated an extra bit after the initial bit-dropping calculation and still have the signaling and control information and samples fit within the fixed-size transmission block.

18. The invention of claim 17 wherein each remote transmission node further comprises means for including in the signaling and control information for each call entry an active/idle indication, a digitized voice/non-digitized voice indication, a logical channel number assigned to the call and an end of signaling and control field indication in the last such entry.

19. The invention of claim 18 wherein each remote transmission node further comprises means for detecting call originations and terminations and for generating a signaling and control field entry having a prescribed logical channel number reserved for control functions in response thereto.

20. The invention of claim 19 wherein the central processing unit is connected to the switching fabric at a port corresponding to the prescribed logical channel number reserved for control functions, so that packets generated by an input trunk interface means having the prescribed logical channel number are directed to the central processing unit.

21. The invention of claim 20 wherein the central processing unit is a means for determining an appropriate route through the switching fabric in response to a call origination packet from an input trunk interface means and for generating a packet containing a destination output trunk interface means and for returning the generated packet through the switch fabric to the input trunk interface means.

22. The invention of claim 21 wherein the input trunk interface means further comprises means for storing the identity of the destination output trunk interface means.

23. The invention of claim 22 wherein the input trunk interface means further comprises means for storing the active/idle indications and the digitized voice/non-digitized voice indications from the remote trunk interface means in association with the corresponding logical channel numbers.

24. The invention of of claim 23 wherein the input trunk interface means further comprises means responsive to the active/idle and the digitized/non-digitized voice indications for determining the number of bits allocated to samples of each cell, means for collecting samples for each cell into packets, means for attaching packet headers containing an address of an appropriate output trunk interface means, and means for transmitting the packets to the switch.

25. The invention of claim 24 wherein the switch comprises a sorting network having N inputs for receiving packets from N input trunk interface means and N outputs, the sorting network being operable to arrange the incoming packets in numerical order on the N outputs according to the addresses of the output trunk interface means contained in the packet headers, and an expanded banyan network having N times K paths through the network wherein K is the number of connections from the switch to each output trunk interface means, and $\log_2(N \text{ times } K) - \log_2(K)$ binary switching stages.

* * * * *